United States Patent
Berg

Patent Number: 6,019,675
Date of Patent: Feb. 1, 2000

[54] DEVICE FOR DECAPITATION OF FISH

[76] Inventor: Thor Berg, Øvrebakken 10, N-8613, Selfors, Norway

[21] Appl. No.: 09/269,639
[22] PCT Filed: Oct. 1, 1997
[86] PCT No.: PCT/NO97/00265
  § 371 Date: Mar. 31, 1999
  § 102(e) Date: Mar. 31, 1999
[87] PCT Pub. No.: WO98/14067
  PCT Pub. Date: Apr. 9, 1998

[30] Foreign Application Priority Data

Oct. 2, 1996 [NO] Norway ................. 964177

[51] Int. Cl.⁷ ............................. A22C 25/14
[52] U.S. Cl. .......................... 452/64; 452/170
[58] Field of Search .............. 452/64, 166, 170

[56] References Cited

U.S. PATENT DOCUMENTS

| | | |
|---|---|---|
| 2,584,567 | 2/1952 | Fonken et al. . |
| 4,756,058 | 7/1988 | Göllnitz et al. . |
| 5,480,347 | 1/1996 | Hicks ........................... 452/64 |

FOREIGN PATENT DOCUMENTS

| | | | |
|---|---|---|---|
| 0 116 782 | 8/1984 | European Pat. Off. . | |
| 339932 | 8/1921 | Germany ................. | 452/64 |
| 395455 | 5/1924 | Germany . | |
| 32 33 747 | 10/1983 | Germany . | |
| 217416 | 1/1985 | Germany ................. | 452/64 |
| 23177 | 3/1913 | Norway . | |
| 63957 | 9/1941 | Norway ................. | 452/64 |
| 158602 | 10/1988 | Norway . | |
| 182 472 | 2/1963 | Sweden . | |
| 309 659 | 3/1969 | Sweden . | |
| 397 251 | 10/1977 | Sweden . | |
| 428 866 | 8/1983 | Sweden . | |
| 1066026 | 4/1967 | United Kingdom ........... | 452/64 |

Primary Examiner—Willis Little
Attorney, Agent, or Firm—Young & Thompson

[57] ABSTRACT

A device for decapitating fish which are transported in a transport plane and in a transport direction, as they lie on one side on a conveyor belt (12) with their nose facing in the transport direction. At the end of the conveyor belt and above it there is located an endless cutting band (30) which is moved in a circuit around rollers (22, 24, 26) which are supported by a frame (6), the lower edge of the band (30) being sharp and extending in a cutting plane which is parallel to the transport plane. A third actuator device (80) is arranged to stop the fish in turn in a defined position in relation to the cutting band, a second actuator device (66, 68, 70, 72) is arranged to form the band sections which during the band's (30) rotation are located near this position, according to the contour of the gills of the stopped fish concerned, and a first actuator device (16) is arranged to raise and lower the cutting band (30) for cutting off the fish head immediately behind the gills. A computer (110) which stores information concerning the shape of the gills and their position on the fish, depending on the fish type and size, is arranged to continuously receive information about the size and type of the transported fish and to transmit signals to the actuator devices for movement thereof 3 Claims, 2 Drawing Sheets

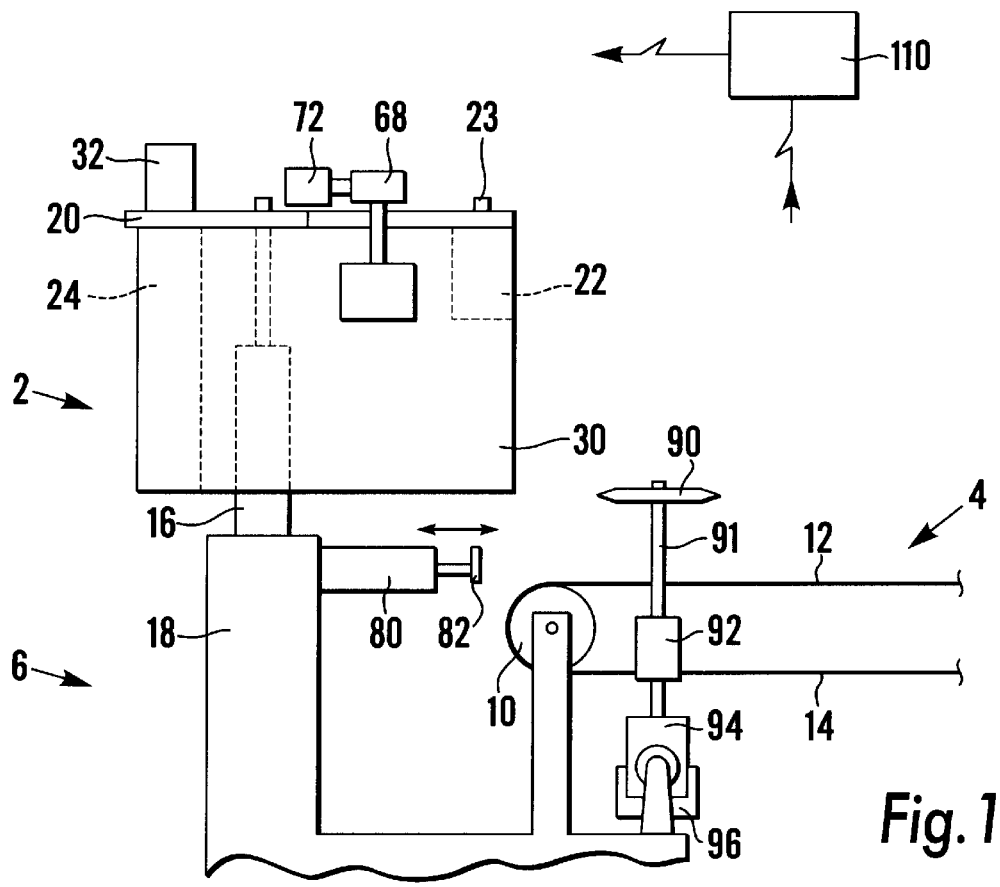
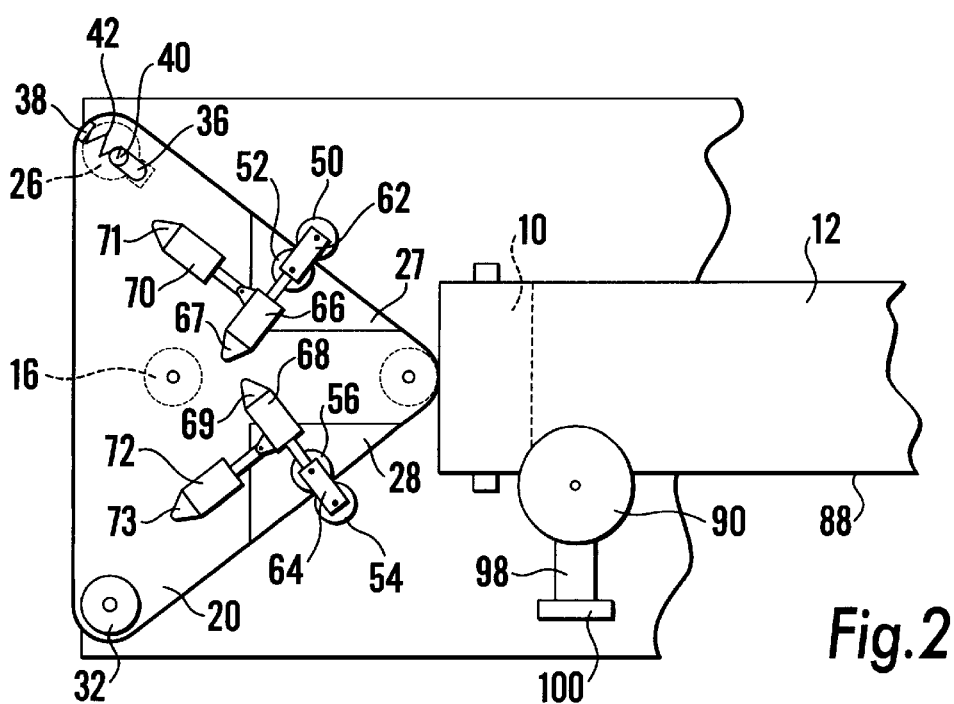

DEVICE FOR DECAPITATION OF FISH

The invention concerns a device for decapitation of fish, comprising a cutting device with a first actuator device for operation thereof, a transport device whereby fish are consecutively transported in a transport direction and a transport plane towards the cutting device while they are lying on one side with their noses turned towards the cutting device, and a computer which is arranged to receive successive information concerning the type and the size of the fish.

In, e.g., NO 158602 there is disclosed a device of the above-mentioned type comprising a rotating, circular knife blade which cuts the fish head alone a plane which extends approximately perpendicularly to the fish's longitudinal direction behind the gills.

With this device a great deal of fish flesh remains on the amputated head and correspondingly less flesh on the remaining part of the fish, thus increasing the amount of waste and reducing the amount of valuable food.

Moreover, the known devices of this type are relatively large and expensive. When used at sea, therefore, they are only suitable for relatively large boats. In the case of small boats fish is gutted and decapitated by hand, which may entail a risk of personal injury and inaccurate gutting and decapitation due to the boat's movements, slippery decks, etc.

The object of the invention is to provide a device of the type mentioned in the introduction which is not encumbered with the above-mentioned disadvantages, and which is suitable for use on boats with a length of down to approximately 10 m.

The characteristics of the device according to the invention are presented in the characteristic features indicated in the claims.

The invention will now be described in more detail with reference to the drawing which schematically illustrates an embodiment of the device according to the invention.

FIG. 1 is a side view of a device according to the invention, where components have been cut away.

FIG. 2 is a top view of the device illustrated in FIG. 1.

Figure 3:
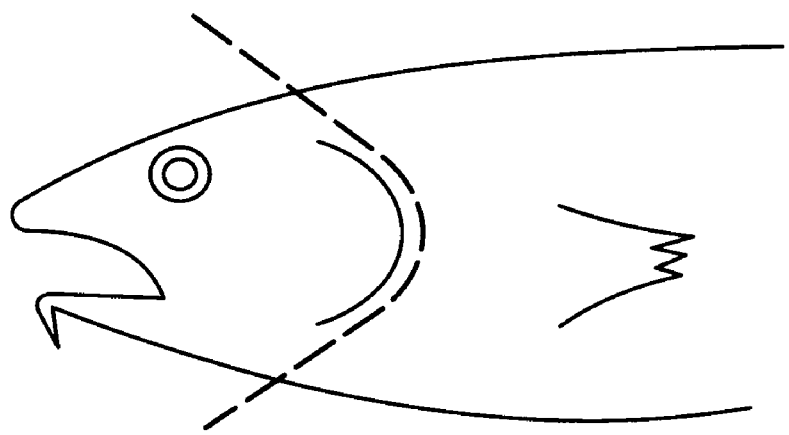
FIGS. 3 and 4 are views of the front section of fish of two different types.

The position and direction indications used below should be understood to refer to the figures concerned as these are viewed by the reader, "up", e.g., being understood as the direction towards the edge of the page which faces away from the reader.

As will be seen from the following description, the device according to the invention comprises a number of actuators. It should be understood that these comprise two main components which can be moved in relation to each other for movement of one object in relation to a second object, the actuator being connected on one side to one object and connected on the other side to the second object. The type of actuator is of no significance here. Thus the actuator may be a hydraulic cylinder, a pneumatic cylinder, an electrically operated jack, or the like.

As illustrated in FIGS. 1 and 2 the device for decapitation of fish comprises a decapitation device 2 and a conveyor 4 which are supported on a common frame 6.

The conveyor may be a belt conveyor of a known per se type, which has turning rollers 10, only one of which is shown, which are rotatably mounted on the frame 2, and which support a conveyor belt with an upper and a lower part 12 and 14 respectively. During operation the upper part 12 is moved to the left and is arranged for transport of fish substantially in a horizontal transport plane.

The decapitation device 2 comprises a first actuator device which in the illustrated embodiment comprises a first actuator 16. The first actuator 16 is connected on one side to a frame section 18, which is located remotely from the shown, left end section of the conveyor belt and in the conveyor belt's extension. On the other side the actuator 16 is connected to a support plate 20. The actuator 16 is arranged to lift or lower the support plate in a linearly translational manner in the same way as a lifting table and may, e.g., be an articulated jack or the like. The first actuator device may comprise guide rods etc. in order to obtain the linear movement.

The support plate 20 is approximately in the form of a triangle, and one of the corner areas of the triangle is located near the longitudinal centre line of the conveyor belt's upper part 12 and the left-hand end of this part 12.

Rollers 22,24,26 which are rotatably connected to the support plate 20, but which are axially secured in relation to the support plate 20, extend downwards from and perpendicularly to it at each of the support plate's corner areas.

The roller which is provided at the corner area which is located near the upper part 12 constitutes a turning roller 22, which may be provided rotatable on an axle rod 23 which projects down from the support plate 20 and is perpendicular to and firmly connected thereto.

The two remaining corner areas face away from the upper part 12, and here there is provided a driving roller 24 or a tension roller 26.

Around the rollers extends an endless, flexible and plate-shaped cutting band 30. The driving roller 24 and the tension roller 26 have a length which corresponds to the width of the cutting band, while the length of the turning roller is less than this width.

Between the turning roller 22 and the driving roller 24 or the tension roller 26 cut-outs 27,28 are provided in the support plate.

The cutting band 30 therefore extends substantially in the form of a triangle around the rollers 22,24,26 and downwards from the support plate 20, and the lower edge of the cutting band extends in a band plane and is sharp and may include sawteeth or the like.

The driving roller 24 is driven by a motor 32 which is attached to the support plate 20. The motor's shaft may extend downwards through a hole in the support plate 20 and the driving roller may be firmly connected to this shaft (not shown).

The tension roller's rotary shaft 40 may extend at the top through an oblong hole 36 in the support plate 20, this hole 36 extending towards the central section of the support plate. The section of the rotary shaft 40 which extends through the hole 36 may be flattened and have a width which is slightly less than the width of the oblong hole 36, thus preventing the rotary shaft 40 from rotating in the hole. Furthermore, the rotary shaft 40 may have two transverse sliding flanges (not shown), whose width is greater than the width of the hole 36, and which are provided on each side of the support plate 20 with a spacing which is slightly greater than the thickness of the support plate 20, thus enabling the rotary shaft 40 to be moved in the hole 36 while at the same time continuing to extend perpendicularly to the support plate 20, since it is supported by the sliding flanges which slide on the support plate. At this corner of the support plate 20 a bracket 38 projects upwards therefrom, and between this bracket 38 and the shaft of the tension roller there extends a tension screw spring 42, which attempts to pull the rotary shaft 40 and thereby the tension roller 26 away from the support plate's central section and maintain a tensile force in the cutting band 30.

The lifting actuator 16 can move the cutting band so far down that its lower edge located furthest to the right, i.e. the edge which is located near the upper part 12, extends under the plane for the upper part 12, but without touching it.

Between the turning roller 22 and the driving roller 24 or the tension roller 26 there are provided forming bodies whereby adjacent band sections can be moved. The path of the band section which is located at the turning roller 22 can thereby be formed. More specifically, this band section can be adapted to the contour of the edge of the gill of a fish which is being transported on the upper part with its nose facing in the part's direction of movement, i.e. towards the cutting band at the turning roller 22.

In the illustrated embodiment of the device according to the invention the forming bodies are composed of pairs of rollers 50,52 and 54,56 respectively which extend parallel to the rollers 22,24,26, one forming roller 50,54 of each pair of rollers extending on the outside of the cutting band, and the second forming roller 52,56 extending on the inside of the cutting band. The pairs of rollers 50,52 and 54,56 are supported by and are rotatably connected to support pieces 62,64 which are movable in the band plane and extend immediately above the cutting band 30.

On one side two guide actuators 66,68 are connected with respective of these support pieces 62,64, and on the other side linked with the support plate 20 at 67 and 69 respectively, thus enabling the support pieces 62,64 to be moved substantially perpendicularly to the adjacent section of the cutting band 30.

Two rotating actuators 70,72 are linked on one side with the guide actuators 66 and 68 respectively and with the support plate 20 at 71,73 in such a manner that they can effect an oscillation of the guide actuators 66,68 about their linkage points 67,69 and thereby effect movement of the support pieces 62,64 substantially along the adjacent section of the cutting band 30. The pairs of rollers 50,52; 54,56 can thereby move and form the cutting band in such a manner that sections thereof which are successively moved past the turning roller 22 are given a shape which corresponds to the contour of the rear edge of the gills of the fish which is transported on the belt part 12. The guide actuators 66,68 and the rotating actuators 70,72 form components of a second actuator device.

The decapitation device furthermore has a third actuator device which comprises a third actuator 80, which is attached on one side to the frame 6 under the support plate 20, and which on the other side supports and is arranged to move a stop or contact piece 82. The contact piece 82 is located on the left of and remotely from the left-hand end of the upper part 12 and substantially in the extension thereof, and can be moved by the actuator 80 towards and away from this part 12. The contact piece 82 may have a sensor (not shown) which is arranged to establish whether an object touches or is pressed against it and to emit a corresponding electrical signal.

On one side 88 of the left-hand end section of the upper part 12 there may be provided a plate-shaped, circular cutting blade or knife 90. The cutting blade 90 extends in a plane which is parallel to the transport plane and is arranged to project over the upper part 12 a distance calculated from the said side 88. The cutting blade 90 is attached to the rotary shaft 91 of a motor 92. This rotary shaft extends perpendicularly on the transport plane and near the side 88.

A first knife actuator 94 which is located under the motor 92, is attached on one side to this motor 92 and on the other side slidably mounted in a rail 96 which is attached to the frame 6. This first knife actuator 94 is arranged to raise or lower the motor 92. The rail 96 extends horizontally and perpendicularly on a vertical plane which extends in the longitudinal direction of the upper belt part 12.

A second knife actuator 98 is connected on one side with the first knife actuator 94 and on the other side with a bracket 100 of the frame 6, which bracket 100 is located in the extension of the rail 96. The second actuator 98 is arranged to move the first knife actuator 94 along the rail 96. The cutting blade 90 can thereby be moved up and down in relation to the part 12, and sideways towards and away from it by means of the knife actuators 94,98 while simultaneously being rotated by means of the motor 92.

The part 12 is arranged to transport fish which are lying on one side with their noses facing the cutting device 2 while the belly side is located near the side 88 of the part 12 at which the cutting blade 90 is located.

The device also comprises a computer 110 which is arranged to receive information concerning the type of the individual fish and a value for one or more parameters which are characteristic for the size of these fish, e.g. the weight, from known per se measuring devices (not shown) which are mounted alone the part 12, and which are arranged to measure the fish consecutively. Furthermore, the computer 110 is arranged to receive information from the sensor on the contact piece 82 concerning whether a fish has come into contact with the contact piece 82. The computer 110 is also arranged to prestore input information concerning the height, thickness. gill shape and the length between the nose and the rear edge of the gills of average fish of the type concerned, as a function of their weight. Moreover. the computer 110 is arranged to transmit signals directly or indirectly to the actuator devices and the motors for operation thereof.

In FIG. 3 a fish is illustrated with a gill contour of a first type. A section of the cutting band is shown with dotted lines, the cutting band having been adapted to the gill contour by means of the band forming device.

Figure 4:
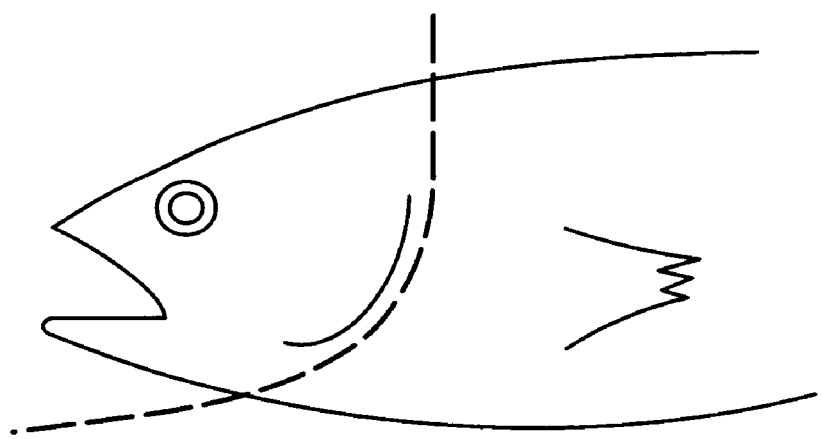

In FIG. 4 a fish is illustrated of a second type with a gill contour of a second type. Here too a section of the cutting band is shown with dotted lines.

Since the fish head is cut along the gill contour, a maximum amount of flesh is left on the remaining fish body.

The function of the device according to the invention is as follows, on the basis that the conveyor belt is in operation, on its upper part 12 there are transported fish which are lying in the above-described manner, and that the cutting band is located in a raised position.

When a fish passes the measuring devices and the computer 110 establishes the type and size of a fish by measuring, e.g., its weight, the computer transmits signals to the guide actuators 66,68 and the rotating actuators 70,72 for forming the section of the cutting band which is located near the turning roller 22 for adaptation thereof to the gill shape of the fish concerned, i.e. the gill shape of an average fish of the established type and with the established weight. The spring 42 may hereby permit a movement of the tension roller 26 away from the bracket 38 to enable the required forming of the cutting band to be performed.

The computer 110 then transmits a signal to the third actuator 80 to set the contact piece 82 at a computed horizontal distance from a vertical extension of the edge of the cutting band which is located nearest the part 12. In addition the computer transmits signals to the knife actuators 94,98 to set the cutting blade 90 at such a height above the part 12 and at such a distance from its edge 88 that the cutting blade 90 performs an incision in the fish's belly along a median plane of the fish when it is moved past the cutting blade 90. When the fish is transported past the cutting blade 90, the second knife actuator 98 may be supplied with signals from the computer 110, and during the fish's movement past the cutting blade the latter may be moved across the transport direction according to a suitable path, thus ensuring that the cutting blade 90 guts the fish correctly and, e.g., is moved away from it when the cutting blade 90 reaches the fish's vent.

When the fish's nose touches the contact piece 82, the fish is secured in relation to the frame 6 even though the conveyor belt continues to move, in the course of which the fish slides on the conveyor belt. The sensor which is provided on the contact piece 82 thereby transmits a signal to the computer 110, which in turn transmits a signal to the first actuator 16 and possibly to the motor 32 (if it is not run continuously) for starting thereof, which causes the rotating cutting band 30 to be lowered and the fish's head cut immediately behind the gills.

During cutting the fish's head therefore remains lying slightly outside the left-hand end of the conveyor belt's upper part 12, with the result that the cutting band 30 in its lowest position does not touch it. As a result neither the cutting band 30 nor the upper part 12 are damaged.

The computer then transmits a new signal to the first actuator 16, with the result that the cutting band is raised once again, and a signal to the third actuator 80 for movement of the contact piece 82 away from the upper belt part 12, thus preventing the contact piece 82 from braking the headless fish body. This fish body can thereby fall down from this belt part 12 at its left-hand end and may be transported further by means of other transport devices.

The device is thereby ready to receive a new fish and renewed setting of the actuators.

If the actuators, e.g., are hydraulic or pneumatic actuators, i.e. of such a type that they cannot be controlled directly by electrical signals from the computer, the device may comprise known per se components such as valves for control of the pressure fluid to the actuators or a reservoir for this purpose in a known per se manner, the valves being magnetic valves which are controlled by signals from the computer 110.

Instead of rollers, sliding pieces may be provided on which the cutting band can slide and whereby it can be formed.

I claim:

1. A device for decapitation of fish, comprising a cutting device (2) with a cutting element and a first actuator device (16) for operation thereof, and a transport device (4) for transport of fish one after the other in a transport direction towards the cutting device (2) while the fish are lying on one side on a support which extends in a transport plane, characterized in that the cutting element is a driven, endless, flexible cutting band (30) with a cutting edge which extends in a band plane which is approximately parallel to the transport plane, where the cutting band (30) by means of the first actuator device (16) is movable in a cutting direction which extends substantially perpendicularly to the band plane, that the cutting device comprises forming bodies (50, 52, 54, 56) which are arranged to influence the cutting band (30) for forming of the path of the cutting edge of the band (30) in the band plane, and that the device further comprises a stop device having a stop element (28) for stopping of a fish to be decapitated in a defined position relative to the cutting band (30) during the cutting.

2. A device according to claim 1, characterized in that the forming bodies (50, 52, 54, 56) are movable by means of a second actuator device (66, 68, 70, 72) and that the stop device has a third actuator device (80) for movement of the stop element (82) in the direction of movement of the fish.

3. A device according to claim 2, comprising a computer (110) which is arranged for reception of successive information relative to the type and size of the fish, characterized in that the computer (110) has a memory wherein information concerning the average gill shape for types and sizes of possible fish is stored, and the computer (110) is arranged to select data for a gill shape for a possible fish, i.e. the next fish to be decapitated, and the position and the contour of the gill opening of this fish based on the stored and the successive information, and to transmit a control signal to the second actuator device (66, 68, 70, 72) for forming the cutting band (30) to correspond to the gill contour, and to transmit a control signal to the third actuator device (80) for stopping the fish in a defined position relative to the cutting band, and to transmit a control signal to the first actuator device (16) for movement of the band in the cutting direction.

* * * * *